(12) United States Patent
Brown et al.

(10) Patent No.: US 11,459,485 B2
(45) Date of Patent: Oct. 4, 2022

(54) NON-FLUORINATED COATING AND FINISH AGENTS

(71) Applicant: THE CHEMOURS COMPANY FC, LLC, Wilmington, DE (US)

(72) Inventors: Gerald Oronde Brown, Swedesboro, NJ (US); Tess Crosetto, Philadelphia, PA (US); Ewa Kohler, West Chester, PA (US); John Christopher Sworen, Lincoln University, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 288 days.

(21) Appl. No.: 16/344,199

(22) PCT Filed: Oct. 31, 2017

(86) PCT No.: PCT/US2017/059170
§ 371 (c)(1),
(2) Date: Apr. 23, 2019

(87) PCT Pub. No.: WO2018/085217
PCT Pub. Date: May 11, 2018

(65) Prior Publication Data
US 2019/0256739 A1  Aug. 22, 2019

Related U.S. Application Data

(60) Provisional application No. 62/415,543, filed on Nov. 1, 2016.

(51) Int. Cl.
| | |
|---|---|
| *C09D 183/12* | (2006.01) |
| *C09D 7/65* | (2018.01) |
| *C09D 7/63* | (2018.01) |
| *C09D 133/02* | (2006.01) |
| *D06M 15/267* | (2006.01) |
| *D06M 15/647* | (2006.01) |
| *C08K 3/18* | (2006.01) |
| *D06M 15/233* | (2006.01) |
| *C09D 5/16* | (2006.01) |
| *C09D 5/14* | (2006.01) |
| *D06M 15/263* | (2006.01) |

(Continued)

(52) U.S. Cl.
CPC ........... *C09D 183/12* (2013.01); *C08G 77/14* (2013.01); *C08K 3/18* (2013.01); *C08L 33/00* (2013.01); *C09D 5/00* (2013.01); *C09D 5/14* (2013.01); *C09D 5/1625* (2013.01); *C09D 5/1637* (2013.01); *C09D 5/1675* (2013.01); *C09D 7/63* (2018.01); *C09D 7/65* (2018.01); *C09D 133/02* (2013.01); *D06M 15/233* (2013.01); *D06M 15/263* (2013.01); *D06M 15/267* (2013.01); *D06M 15/647* (2013.01); *D06M 15/6436* (2013.01); *D06M 2200/01* (2013.01); *D06M 2200/11* (2013.01); *D06M 2200/12* (2013.01); *D06M 2200/20* (2013.01); *D06M 2200/30* (2013.01); *D06M 2200/45* (2013.01); *D06M 2200/50* (2013.01)

(58) Field of Classification Search
CPC .......... C09D 7/63; C09D 7/65; C09D 133/02; C09D 5/00; C09D 5/1625; C09D 5/14; C09D 5/1637; C09D 183/12; C09D 5/1675; C08K 3/18; C08G 77/14; C08L 33/00; C06M 15/233; C06M 15/267; C06M 15/647; C06M 15/6436; C06M 15/263; C06M 2200/12; C06M 2200/45; C06M 2200/30; C06M 2200/01; C06M 2200/11; C06M 2200/50; C06M 2200/20
See application file for complete search history.

(56) References Cited

U.S. PATENT DOCUMENTS

| | | |
|---|---|---|
| 2,971,934 A | 2/1961 | Brown |
| 3,321,424 A | 5/1967 | Imes |
| | (Continued) | |

FOREIGN PATENT DOCUMENTS

| | | |
|---|---|---|
| CN | 104356819 A | 2/2015 |
| DE | 10008151 A1 | 8/2001 |
| | (Continued) | |

OTHER PUBLICATIONS

English language machine translation of JP 2001-348784 (Year: 2001).*

(Continued)

*Primary Examiner* — Angela C Scott

(57) ABSTRACT

The present invention relates to a coating composition with 10 to 100% by weight of a non-fluorinated compound mixture, which comprises at least one compound b and at least one compound a, c, or d: a) alkali metal salt of poly(meth)acrylic acid, alkali metal salt of poly(meth)acrylic acid copolymer, ammonium compound or amine salt of poly(meth)acrylic acid, ammonium compound or amine salt of poly(meth)acrylic acid copolymer, or mixtures thereof; b) silicone polyether, alkali metal salt of silicone polyether carboxylate, ammonium compound or amine salt of silicone polyether carboxylate, or mixtures thereof; c) salt of hydrolyzed α-olefin/maleic anhydride copolymer, salt of esterified α-olefin/maleic anhydride copolymer, α-olefin/maleic anhydride copolymer amic acid resin or salt thereof, or mixtures thereof; or d) polycarboxylate calcium sequestrants or mixtures thereof. Such coatings exhibit improved soil and stain cleaning performance.

20 Claims, No Drawings

(51) Int. Cl.
  *C09D 5/00* (2006.01)
  *C08G 77/14* (2006.01)
  *D06M 15/643* (2006.01)
  *C08L 33/00* (2006.01)

(56) References Cited

U.S. PATENT DOCUMENTS

| | | |
|---|---|---|
| 6,201,057 B1 | 3/2001 | Porter |
| 7,078,464 B2 | 7/2006 | Schmidhauser |
| 8,592,040 B2 | 11/2013 | Hayes |
| 8,785,519 B2 | 7/2014 | Krishnan |
| 2002/0045010 A1 | 4/2002 | Rohrbaugh |
| 2007/0021019 A1* | 1/2007 | Rubin ............... B32B 5/02 442/59 |
| 2009/0075063 A1 | 3/2009 | Iida |
| 2012/0149623 A1 | 6/2012 | Li |
| 2013/0101783 A1 | 4/2013 | Materniak et al. |
| 2014/0295724 A1 | 10/2014 | Sworen |
| 2016/0090508 A1 | 3/2016 | Sworen |
| 2016/0090686 A1 | 3/2016 | Sworen |
| 2016/0215154 A1 | 7/2016 | Kawabe et al. |

FOREIGN PATENT DOCUMENTS

| | | |
|---|---|---|
| GB | 1511652 A | 5/1978 |
| JP | 201348784 A | 12/2001 |
| JP | 2001348784 A | 12/2001 |
| JP | 2006214032 A | 8/2006 |
| JP | 2007-246865 A1 | 9/2007 |
| JP | 2009161865 A | 7/2009 |
| JP | 2009185419 A | 8/2009 |
| WO | 2013/059400 A1 | 4/2013 |
| WO | 2013059387 A1 | 4/2013 |
| WO | 2013059395 A1 | 4/2013 |
| WO | 2013059416 A1 | 4/2013 |

OTHER PUBLICATIONS

International Search Report and Written Opinion for PCT/US2017/059170 dated Feb. 2, 2018, 12 pages.

Honda, et al., in *Macromolecules*, 2005, 38, 5699-5705.

Textile Auxiliary Chemistry and Application/Edited by Dong Yongchun, Beijing, China Textile Publishing House, 2007. 7, (Chemical Practical Technology Series), ISBN 978-7-5064-4418-7.

* cited by examiner

NON-FLUORINATED COATING AND FINISH AGENTS

CROSS REFERENCE TO RELATED APPLICATIONS

This application represents a national filing under 35 U.S.C. 371 of International Application No. PCT/US2017/059170 filed Oct. 31, 2017, and claims priority of U.S. Provisional Application No. 62/415,543 filed Nov. 1, 2016.

FIELD OF THE INVENTION

Non-fluorinated hydrophilic compounds are employed as coating or finishing agents to provide surface effects to various articles.

BACKGROUND OF THE INVENTION

Various compositions are known to be useful as treating agents to provide water repellency and optionally stain release to textile substrates. Many such treating agents are fluorinated polymers and copolymers, or non-fluorinated polymers and copolymers. Non-fluorinated compounds are predominately polyacrylate-based or urethane-based copolymers.

Fluorinated polymer compositions are used in the preparation of a wide variety of surface treatment materials to provide surface effects to substrates. Many such compositions are fluorinated surfactants which contain predominantly eight or more carbons in the perfluoroalkyl chain to provide the desired properties. Honda, et al., in *Macromolecules,* 2005, 38, 5699-5705 teach that for perfluoroalkyl chains of greater than 8 carbons, orientation of the perfluoroalkyl groups, designated $R_f$ groups, is maintained in a parallel configuration while for such chains having 6 or less carbons, reorientation occurs. This reorientation is recited to decrease surface properties such as contact angle. Thus, compounds containing shorter perfluoroalkyl chains or having no fluorine content have traditionally exhibited lower performance. Fluoroadditives have also been used to improve cleanability of paints, including latex paints, which generally have poor stain and soil resistance.

BRIEF SUMMARY OF THE INVENTION

The need exists for non-fluorinated compounds that provide surface effects to a variety of substrates, with performance results comparable to fluorinated treating agents. The present invention meets these needs.

The present invention relates to a coating composition comprising 10 to 100% by weight of a non-fluorinated compound mixture, based on the total solids weight of the coating, where the non-fluorinated compound mixture comprises at least one compound from b, and at least one compound from a, c, or d:

a) an alkali metal salt of poly(meth)acrylic acid, alkali metal salt of poly(meth)acrylic acid copolymer, ammonium compound salt of poly(meth)acrylic acid, amine salt of poly(meth)acrylic acid, ammonium compound salt of poly(meth)acrylic acid copolymer, amine salt of poly(meth)acrylic acid copolymer, or mixtures thereof;

b) silicone polyether, alkali metal salt of silicone polyether carboxylate, ammonium compound salt of silicone polyether carboxylate, amine salt of silicone polyether carboxylate, or mixtures thereof;

c) alkali metal salt of hydrolyzed α-olefin/maleic anhydride copolymer, ammonium compound salt of hydrolyzed α-olefin/maleic anhydride copolymer, amine salt of hydrolyzed α-olefin/maleic anhydride copolymer, alkali metal salt of esterified α-olefin/maleic anhydride copolymer, ammonium compound or amine salt of esterified α-olefin/maleic anhydride copolymer, α-olefin/maleic anhydride copolymer amic acid resin, salt of α-olefin/maleic anhydride copolymer amic acid resin, or mixtures thereof; or d) polycarboxylate calcium sequestrants or mixtures thereof; and where the at least one compound from b is from formula (I) or (II):

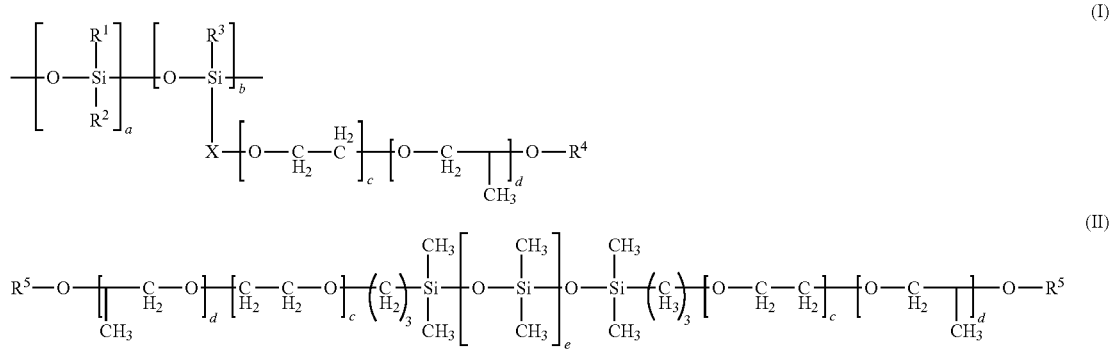

wherein $R^1$, $R^2$, and $R^3$ are independently $C_1$-$C_8$ alkyl groups; X is a linear or branched $C_1$-$C_4$ alkylene group; $R^4$ is independently H or —C(O)—Y—C(O)O$^-$M$^+$; Y is a linear or branched, saturated or unsaturated $C_1$-$C_5$ alkylene group; M is independently H, alkali metal, NH$_4^+$, dialkyl ammonium cation, or amine cation; a and b are independently integers of 1 to 40 where a+b is an integer of at least 2; and c and d are independently integers of 0 to 20 where c+d is an integer of at least 1; $R^5$ is H, a $C_1$-$C_5$ alkyl group, or —C(O)—Y—C(O)O$^-$M$^+$; and e is an integer of 1 to 40.

The present invention further comprises an article comprising a substrate coated with a coating composition, where the coating composition comprises 10 to 100% by weight of a non-fluorinated compound mixture, based on the total solids weight of the coating, where the non-fluorinated compound mixture comprises at least one compound from b, and at least one compound from a, c, or d:

a) an alkali metal salt of poly(meth)acrylic acid, alkali metal salt of poly(meth)acrylic acid copolymer, ammonium compound salt of poly(meth)acrylic acid, amine salt of poly(meth)acrylic acid, ammonium compound salt of poly (meth)acrylic acid copolymer, amine salt of poly(meth) acrylic acid copolymer, or mixtures thereof;

b) silicone polyether, alkali metal salt of silicone polyether carboxylate, ammonium compound salt of silicone polyether carboxylate, amine salt of silicone polyether carboxylate, or mixtures thereof;

c) alkali metal salt of hydrolyzed α-olefin/maleic anhydride copolymer, ammonium compound salt of hydrolyzed α-olefin/maleic anhydride copolymer, amine salt of hydrolyzed α-olefin/maleic anhydride copolymer, alkali metal salt of esterified α-olefin/maleic anhydride copolymer, ammonium compound or amine salt of esterified α-olefin/maleic anhydride copolymer, α-olefin/maleic anhydride copolymer amic acid resin, salt of α-olefin/maleic anhydride copolymer amic acid resin, or mixtures thereof; or d) polycarboxylate calcium sequestrants or mixtures thereof; and where the at least one compound from b is from formula (I) or (II): wherein $R^1$, $R^2$, and $R^3$ are independently $C_1$-$C_8$ alkyl groups; X is a linear or branched $C_1$-$C_4$ alkylene group; $R^4$ is independently H or —C(O)—Y—C(O)O$^-$M$^+$; Y is a linear or branched, saturated or unsaturated $C_1$-$C_5$ alkylene group; M is independently H, alkali metal, $NH_4^+$, dialkyl ammonium cation, or amine cation; a and b are independently integers of 1 to 40 where a+b is an integer of at least 2; and c and d are independently integers of 0 to 20 where c+d is an integer of at least 1; $R^5$ is H, a $C_1$-$C_5$ alkyl group, or —C(O)—Y—C(O)O$^-$M$^+$; and e is an integer of 1 to 40.

The present invention further relates to a method of providing a surface effect to a substrate, the method comprising contacting a substrate with a coating composition, where the coating composition comprises 10 to 100% by weight of a non-fluorinated compound mixture, based on the total solids weight of the coating, where the non-fluorinated compound mixture comprises at least one compound from b, and at least one compound from a, c, or d:

a) an alkali metal salt of poly(meth)acrylic acid, alkali metal salt of poly(meth)acrylic acid copolymer, ammonium compound salt of poly(meth)acrylic acid, amine salt of poly(meth)acrylic acid, ammonium compound salt of poly (meth)acrylic acid copolymer, amine salt of poly(meth) acrylic acid copolymer, or mixtures thereof;

b) silicone polyether, alkali metal salt of silicone polyether carboxylate, ammonium compound salt of silicone polyether carboxylate, amine salt of silicone polyether carboxylate, or mixtures thereof;

c) alkali metal salt of hydrolyzed α-olefin/maleic anhydride copolymer, ammonium compound salt of hydrolyzed α-olefin/maleic anhydride copolymer, amine salt of hydrolyzed α-olefin/maleic anhydride copolymer, alkali metal salt of esterified α-olefin/maleic anhydride copolymer, ammonium compound or amine salt of esterified α-olefin/maleic anhydride copolymer, α-olefin/maleic anhydride copolymer amic acid resin, salt of α-olefin/maleic anhydride copolymer amic acid resin, or mixtures thereof; or d) polycarboxylate calcium sequestrants or mixtures thereof; and where the at least one compound from b is from formula (I) or (II): wherein $R^1$, $R^2$, and $R^3$ are independently $C_1$-$C_8$ alkyl groups; X is a linear or branched $C_1$-$C_4$ alkylene group; $R^4$ is independently H or —C(O)—Y—C(O)O$^-$M$^+$; Y is a linear or branched, saturated or unsaturated $C_1$-$C_5$ alkylene group; M is independently H, alkali metal, $NH_4^+$, dialkyl ammonium cation, or amine cation; a and b are independently integers of 1 to 40 where a+b is an integer of at least 2; and c and d are independently integers of 0 to 20 where c+d is an integer of at least 1; $R^5$ is H, a $C_1$-$C_5$ alkyl group, or —C(O)—Y—C(O)O$^-$M$^+$; and e is an integer of 1 to 40.

DETAILED DESCRIPTION OF THE INVENTION

Features of the embodiments of the present invention as described in the Detailed Description of the Invention can be combined in any manner.

The present invention provides coatings and coated articles having improved water repellency, oil or stain repellency, cleanability and/or other surface effects. The coating compositions provide enhanced performance compared to traditional non-fluorinated commercially available treatment agents. The coatings formed are durable, by which is meant that the coatings are lasting films that are not readily removed by water or cleaning agents. In one aspect, the coatings are not soluble or dispersable in water or cleaning agents once they are dry, and in another aspect, the coatings withstand multiple cleanings without loss of performance.

In one aspect, the present invention relates to a coating composition comprising 10 to 100% by weight of a non-fluorinated compound mixture, based on the total solids weight of the coating, where the non-fluorinated compound mixture comprises at least one compound from b, and at least one compound from a, c, or d:

a) an alkali metal salt of poly(meth)acrylic acid, alkali metal salt of poly(meth)acrylic acid copolymer, ammonium compound salt of poly(meth)acrylic acid, amine salt of poly(meth)acrylic acid, ammonium compound salt of poly (meth)acrylic acid copolymer, amine salt of poly(meth) acrylic acid copolymer, or mixtures thereof;

b) silicone polyether, alkali metal salt of silicone polyether carboxylate, ammonium compound salt of silicone polyether carboxylate, amine salt of silicone polyether carboxylate, or mixtures thereof;

c) alkali metal salt of hydrolyzed α-olefin/maleic anhydride copolymer, ammonium compound salt of hydrolyzed α-olefin/maleic anhydride copolymer, amine salt of hydrolyzed α-olefin/maleic anhydride copolymer, alkali metal salt of esterified α-olefin/maleic anhydride copolymer, ammonium compound or amine salt of esterified α-olefin/maleic anhydride copolymer, α-olefin/maleic anhydride copolymer amic acid resin, salt of α-olefin/maleic anhydride copolymer amic acid resin, or mixtures thereof; or d) polycarboxylate calcium sequestrants or mixtures thereof; and where the at least one compound from b is from formula (I) or (II):

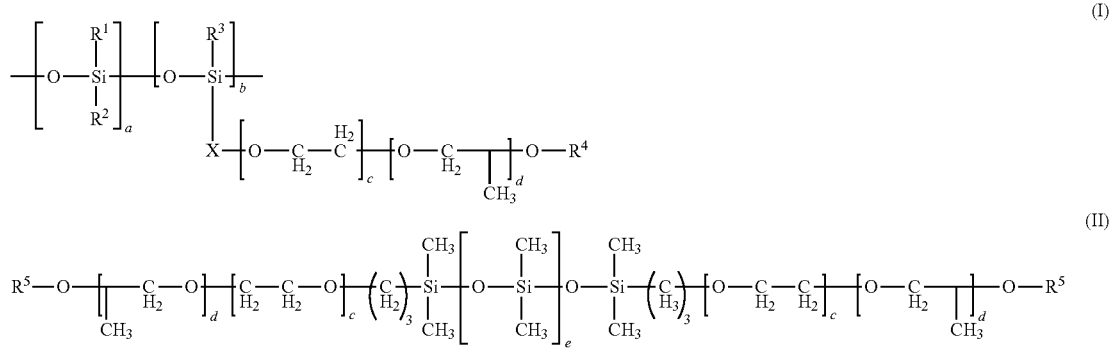

wherein $R^1$, $R^2$, and $R^3$ are independently $C_1$-$C_8$ alkyl groups; X is a linear or branched $C_1$-$C_4$ alkylene group; $R^4$ is independently H or —C(O)—Y—C(O)O$^-$M$^+$; Y is a linear or branched, saturated or unsaturated $C_1$-$C_5$ alkylene group; M is independently H, alkali metal, NH$_4^+$, dialkyl ammonium cation, or amine cation; a and b are independently integers of 1 to 40 where a+b is an integer of at least 2; and c and d are independently integers of 0 to 20 where c+d is an integer of at least 1; $R^5$ is H, a $C_1$-$C_5$ alkyl group, or —C(O)—Y—C(O)O$^-$M$^+$; and e is an integer of 1 to 40.

Alkali metals used to form the salts include but are not limited to Li, Na, and K. The term "ammonium compound" is intended to mean a compound having an ammonium cation. Ammonium compounds include but are not limited to NH$_4^+$ or dialkyl ammonium compounds such as dimethyl ammonium compounds or diethyl ammonium compounds. Amine compounds used to form salt are compounds that form cations, including but not limited to amino acids or aminoalkanols. The term "copolymer" is intended to mean a polymeric compound having at least two different monomeric units. The term includes terpolymers and polymers having more than three different monomeric units.

In one aspect, the non-fluorinated compound mixture comprises at least two of a, c, or d; meaning the non-fluorinated compound mixture comprises at least one compound from each of a and b, b and c, or b and d. In one aspect, the non-fluorinated compound comprises at least three of a, c, or d; meaning the non-fluorinated compound mixture comprises at least one compound from each of a, b, and c; a, b, and d; or b, c, and d. In one aspect, the non-fluorinated compound comprises at least one compound from each of a, b, c, and d. In one aspect, the pH of the non-fluorinated compound mixture, is from about 7 to about 10.5.

The non-fluorinated compound mixture contains at least one compound selected from silicone polyether, alkali metal salt of silicone polyether carboxylate, ammonium compound salt of silicone polyether carboxylate, amine salt of silicone polyether carboxylate, or mixtures thereof. In one embodiment, the additive compound or mixture of compounds is soluble or dispersible in water at 1% by weight at room temperature. In one embodiment, the non-fluorinated compound comprises at least two of a, b, c, or d; and comprises at least one compound selected from silicone polyether, alkali metal salt of silicone polyether carboxylate, ammonium compound salt of silicone polyether carboxylate, amine salt of silicone polyether carboxylate, or mixtures thereof.

When the non-fluorinated compound is selected from a silicone polyether or silicone polyether carboxylate salt, it may be of the formula (I) wherein $R^1$, $R^2$, and $R^3$ are independently $C_1$-$C_8$ alkyl groups; X is a linear or branched $C_1$-$C_4$ alkylene group; $R^4$ is independently H or —C(O)—Y—C(O)O$^-$M$^+$; Y is a linear or branched, saturated or unsaturated $C_1$-$C_5$ alkylene group; M is independently H, alkali metal, NH$_4^+$, dialkyl ammonium cation, or amine cation; a and b are independently integers of 1 to 40 where a+b is an integer of at least 2; and c and d are independently integers of 0 to 20 where c+d is an integer of at least 1. The compounds have significant hydrophilic content by the incorporation of the silicone polyether monomeric unit. Such polymers may optionally include additional repeat units, such as alkyl siloxane units having alkyl groups of $C_1$-$C_6$. In one aspect, b is at least 1; in another aspect, b is at least 2, and in a third aspect, b is at least 3. In one aspect, a+b is at least 2; in another aspect, a+b is at least 4, and in a third aspect, a+b is at least 6. In one embodiment, the non-fluorinated compound is soluble or dispersible in water at 1% by weight at room temperature. Where $R^4$ is H, the non-fluorinated compound is a silicone polyether. Where $R^4$ is —C(O)—Y—C(O)O$^-$M$^+$, the compound is a polycarboxylate including but not limited to a silicone polyether succinate, silicone polyether malonate, or silicone polyether propanate. In one aspect, Y is a linear or branched $C_1$-$C_5$ alkylene group that optionally contains one olefin group; and in another aspect, Y is a linear or branched alkylene $C_2$ to $C_4$ that optionally contains one olefin group.

In another aspect, the silicone polyether additive compound may be of the formula (II) wherein $R^5$ is H, a $C_1$-$C_5$ alkyl group, or —C(O)—Y—C(O)O$^-$M$^+$; Y is a linear or branched, saturated or unsaturated $C_1$-$C_5$ alkylene group; M is independently H, alkali metal, NH$_4^+$, dialkyl ammonium cation, or amine cation; e is an integer of 1 to 40; and c and d are independently integers of 0 to 20 where c+d is an integer of at least 1. In one aspect, $R^5$ is H or CH$_3$. The compounds have significant hydrophilic content by the incorporation of the alkoxide units at the endgroups. In one aspect, e is at least 2; in another aspect, e is at least 4, and in a third aspect, e is at least 6.

The —(OCH$_2$CH$_2$)— of formula (I) or (II) represents oxyethylene groups (EO) and —(OCH$_2$CH(CH$_3$))— represents oxypropylene groups (PO). These compounds can contain only EO groups, only PO groups, or mixtures thereof in random or block configuration. These compounds can also be present as a tri-block copolymer designated PEG-PPG-PEG (polyethylene glycol-polypropylene glycol-polyethylene glycol), for example. In one embodiment, c+d of formula (I) or (II) is 1 to 30; in another embodiment, c+d is 2 to 20; and in a third embodiment, c+d is 6 to 16.

In one embodiment, the non-fluorinated compound mixture contains at least one compound selected from an alkali metal salt of poly(meth)acrylic acid, alkali metal salt of poly(meth)acrylic acid copolymer, ammonium compound salt of poly(meth)acrylic acid, amine salt of poly(meth) acrylic acid, ammonium compound salt of poly(meth)acrylic acid copolymer, or amine salt of poly(meth)acrylic acid copolymer, or mixtures thereof. The use of parentheses in the term "(meth)acrylic" indicates that the term covers both acrylic and methacrylic substances. Such compounds are available commercially, or can be obtained by neutralizing a poly(meth)acrylic acid or poly(meth)acrylic acid copolymer. In one aspect, the molecular weight of the poly(meth) acrylic acid or copolymer salt, as measured by the $M_n$ of the poly(meth)acrylic acid or copolymer, is at least 2,000 Da; in another aspect, the molecular weight $M_n$ is at least 10,000 Da; and in another aspect, the molecular weight $M_n$ is at least 20,000 Da. If the non-fluorinated compound is a salt of a poly(meth)acrylic acid copolymer, the (meth)acrylic acid repeat unit may compose at least 19 weight % of the copolymer. In one aspect, the (meth)acrylic acid repeat unit may compose at least 30 weight % of the copolymer, and in another aspect, the (meth)acrylic acid repeat unit may compose at least 50 weight % of the copolymer.

Molecular weight $M_n$ and $M_w$ can be measured by a size exclusion chromatographer using a polymethacrylic acid (PMAA) calibration standard. For example, the polymer solutions were diluted to 3.0±0.3 mg/mL in 0.1 M $Na_2HPO_4$, allowed to sit at ambient temperature for 4 days, and passed through 0.2 μm syringe filter. 20 μL of polymer solution was injected in the same mobile phase through AGILENT 1100 system equipped with a G1362A refractive index detector, pumped at 1.0 mL/min for 40 min through two PSS SUPREMA columns (10,000 A, 10 μm; 1,000 A, 5 μm, both 8×300 mm) held at 30° C. PMAA calibration standards (PSS) were used to generate a calibration curve from 1,310 to 549,000 Dalton.

In one embodiment, the non-fluorinated compound mixture contains at least one compound selected from an alkali metal salt of hydrolyzed α-olefin/maleic anhydride copolymer, ammonium compound or amine salt of hydrolyzed α-olefin/maleic anhydride copolymer, alkali metal salt of esterified α-olefin/maleic anhydride copolymer, ammonium compound or amine salt of esterified α-olefin/maleic anhydride copolymer, α-olefin/maleic anhydride copolymer amic acid resin, salt of α-olefin/maleic anhydride copolymer amic acid resin, or mixtures thereof. The α-olefin may be a linear or branched $C_2$-$C_{22}$ alkene, which may also include cyclic structures. Examples of the α-olefin include but are not limited to styrene, α-methyl styrene, cyclopentene, ethylene, propene, butene, pentene, hexene, heptene, octene, nonene, decene, undecene, dodecene, tetradecene, hexadecene, octadecene, and eicosene. Such compounds are available commercially, or can be obtained by neutralizing an α-olefin/maleic anhydride copolymer. Salts of hydrolyzed α-olefin/maleic anhydride copolymers contain the repeat unit —[CH(COO$^-$M$^+$)—CH(COO$^-$M$^+$)]-, where M is an alkali metal, ammonium, or amine. The esterified salts can be obtained by esterifying the maleic anhydride groups and then neutralizing the copolymer. Salts of esterified α-olefin/maleic anhydride copolymers contain the repeat unit —[CH(COOR)—CH(COO$^-$M$^+$)]-, where R is a monovalent organic group, and M is an alkali metal, ammonium, or amine. In one aspect, R is a linear or branched $C_1$-$C_{12}$ alkyl group. Where the additive is an α-olefin/maleic anhydride copolymer amic acid resin or salt thereof, the copolymers contain the repeat unit —[CH(C(O)—NH—CH$_3$)—CH(COO$^-$M$^+$)]-, where M is H, an alkali metal, ammonium, or amine. In one aspect, the molecular weight of the styrene/maleic anhydride copolymer salt, as measured by the $M_n$, is at least 1,000 Da; in another aspect, the molecular weight $M_n$ is at least 1,500 Da; and in another aspect, the molecular weight $M_n$ is at least 2,000 Da. The maleic anhydride repeat unit, including the hydrolyzed, esterified, or amic acid forms, may compose at least 19 weight % of the copolymer. In one aspect, the maleic anhydride repeat unit may compose at least 30 weight % of the copolymer, and in another aspect, the maleic anhydride repeat unit may compose at least 50 weight % of the copolymer.

In one embodiment, the additive compound mixture contains a polycarboxylate calcium sequestrant, or mixtures thereof. The use of the term "polycarboxylate calcium sequestrant" in this text refers to non-polymeric organic compounds having multiple carboxylate groups, where the compounds are capable of forming a chelate complex with calcium. For example, the additive compound may be an alkali metal am inopolycarboxylate, an ammonium compound am inopolycarboxylate, or amine salt of aminopolycarboxylate. Such compounds may contain one or more nitrogen atoms connected through alkylene groups to two or more carboxylate groups. In one aspect, the polycarboxylate calcium sequestrants contain at least two carboxylate groups; in another aspect, the polycarboxylate calcium sequestrants contain at least three carboxylate groups; and in another aspect, the polycarboxylate calcium sequestrants contain at least four carboxylate groups. Examples of polycarobylate calcium sequestrants include but are not limited to salts of glyconic acid, salts of ethylenediamine tetraacetate, salts of fura-2, salts of aminodiacetic acid, salts of nitrilotriacetic acid, salts of diethylenetriaminepentaacetic acid, salts of ethylenediamine-N,N'-disuccinic acid, salts of ethylene glycol-bis(β-aminoethyl ether)-N,N,N', N'-tetraacetic acid, salts of 1,2-bis(o-aminophenoxy)ethane-N,N, N',N'-tetraacetic acid, salts of 1,4,7,10-tetraazacyclododecane-1,4,7,10-tetraacetic acid, salts of L-glutamic acid N,N-diacetic acid, salts of polyaspartate, salts of 1,4,7,10-tetraazacyclododecane-1,4,7,10-tetraacetic acid, or salts of iminodisuccinate.

In one aspect, the coating composition comprises 30 to 100% by weight of the non-fluorinated compound mixture, based on the total solids weight of the coating composition. In another aspect, the coating composition comprises 50 to 100% by weight of the non-fluorinated compound mixture, based on the total solids weight of the coating composition. The coating composition may also contain a liquid carrier that is not present once the coating is dry or solid, such as water or organic solvent. In one aspect, the liquid carrier is water. Additional components present in the coating composition may include but are not limited to surface effect agents; pigments such as dyes or $TiO_2$; surfactants; curing agents; pH adjustors; or wetting agents. The term "solids weight of the coating", is used to mean the sum of the coating components that would remain once the aqueous, solvent, or other liquid components evaporated. In other words, it is the sum of the non-aqueous, non-solvent, and non-volatile components of the coating.

The coating composition may further comprise a hydrophobic surface effect agent, which may be fluorinated or non-fluorinated. For example, the coating composition may further comprise a fatty acid ester of cyclic or acyclic polyols, fatty esters of polycarboxylic acids, hydrophobic non-fluorinated cationic acrylic polymers, hydrophobic non-fluorinated anionic acrylic polymers, hydrophobic non-fluorinated nonionic acrylic polymers, partially fluorinated urethanes, hydrophobic non-fluorinated urethanes, cationic partially fluorinated acrylic polymers or copolymers, non-ionic partially fluorinated acrylic polymers or copolymers, partially fluorinated acrylamide polymers or copolymers, fluorinated or non-fluorinated phosphates, fluorinated ethoxylates, fluorinated or non-fluorinated organosilanes, silicones, waxes, including parafins, and mixtures thereof.

In one embodiment, the coating composition comprises 10 to 90% by weight of the non-fluorinated compound and 10 to 90% by weight of the hydrophobic surface effect agents, based on the total solids weight of the coating. In another embodiment, the coating composition comprises 30 to 90% by weight of the non-fluorinated compound and 10 to 70% by weight of the hydrophobic surface effect agents, based on the total solids weight of the coating; and in a third embodiment, the coating composition comprises 50 to 90% by weight of the non-fluorinated compound and 10 to 50% by weight of the hydrophobic surface effect agents, based on the total solids weight of the coating. Hydrophobic surface effect agents provide surface effects such as moisture control, strength, anti-slip, anti-static, anti-snag, anti-pill, stain repellency, stain release, soil repellency, soil release, water repellency, oil repellency, odor control, antimicrobial, sun protection, anti-blocking, cleanability, dust resistance, leveling, corrosion resistance, acid resistance, anti-fog, or anti-ice, and similar effects. Some stain release and soil release agents are hydrophilic and include compounds such as polymethyl acrylates or hydrophilic urethanes.

Suitable fatty acid esters of cyclic or acyclic polyols include reaction products of fatty acids with cyclic or acyclic sugar alcohols, or pentaerythritols including dipentaerythritol, which may also contain internal alkoxide units. Fatty esters of polycarobyxlic acids include reaction products of long-chain alkanols with polycarboxylic acids. Examples of polyols and polycarboxylic acids include but are not limited to glucose, 1,4-anhydro-D-glucitol, 2,5-anhydro-D-mannitol, 2,5-anhydro-L-iditol, isosorbide, sorbitan, glyceraldehyde, erythrose, arabinose, ribose, arabinose, allose, altrose, mannose, xylose, lyxose, gulose, glactose, talose, fructose, ribulose, mannoheptulose, sedohelptulose, threose, erythritol, threitol, glucopyranose, mannopyranose, talopyranose, allopyranose, altropyranose, idopyranose, gulopyranose, glucitol, mannitol, erythritol, sorbitol, arabitol, xylitol, ribitol, galactitol, fucitol, iditol, inositol, pentaerythritol, dipentaerythritol, volemitol, gluconic acid, glyceric acid, xylonic acid, galactaric acid, ascorbic acid, citric acid, gluconic acid lactone, glyceric acid lactone, xylonic acid lactone, glucosamine, galactosamine, or mixtures thereof. Suitable fatty acids include, but are not limited to, caprylic acid, capric acid, lauric acid, mysteric acid, palmitic acid, stearic acid, arachidic acid, behenic acid, lignoceric acid, palmitoleic acid, lineolic acid, oleic acid, erucic acid, alkoxylated versions of these acids, and mixtures thereof. In one embodiment, the fatty acid esters or fatty esters contain linear or branched alkyl groups having 11 to 29 carbons, and in another embodiment, the contain linear or branched alkyl groups having 17 to 21 carbons. Particular examples include mono-substituted, di-substituted, or tri-substituted sorbitans, such as SPAN, sorbitan stearates, or sorbitan behenins; mono-, di-, and tri-substituted sorbitans derived from palmitoleic acid, lineolic acid, arachidonic acid, and erucic acid; polysorbates such as polysorbate tristearate and polysorbate monostearate; citrates that are mono-substituted, di-substituted, or tri-substituted with alkyl groups; pentaerythriol esters that are mono-substituted, di-substituted, or tri-substituted with alkyl groups.

Superior properties, along with desirable properties of low yellowing and good durability, are imparted to articles by the combination of the hydrophobic compounds to hydrophobic surface effect agents before application to the articles. These combined blends are applied to the articles in the form of a dispersion in water or other solvent either before, after or during the application of other treatment chemicals.

Of particular interest are fluorinated polymers useful as hydrophobic surface effect agents to provide repellency properties to the surface of treated substrates. These include fluorochemical compounds or polymers containing one or more fluoroaliphatic groups (designated here as $R_f$ groups) which are fluorinated, stable, inert, and non-polar, preferably saturated, monovalent, and both oleophobic and hydrophobic. The $R_f$ groups contain at least 3 carbon atoms, preferably 3 to 20 carbon atoms, more preferably 4 to 12 carbon atoms, and most preferably about 4 to about 6 carbon atoms. The $R_f$ groups may contain straight or branched chain or cyclic fluorinated alkylene groups or combinations thereof. The terminal portion of the $R_f$ groups is preferably a perfluorinated aliphatic group of the formula $C_nF_{2n+1}$ wherein n is from about 3 to about 20. Examples of fluorinated polymer treating agents are CAPSTONE and ZONYL available from The Chemours Company, Wilmington, Del.; ASAHI GARD from Asahi Glass Company, Ltd., Tokyo, Japan; UNIDYNE from Daikin America, Inc., Orangeburg, N.Y.; SCOTCHGARD from 3M Company, St. Paul, Minn.; and NANO TEX from Nanotex, Emeryville, Calif.

Examples of such fluorinated polymers include $R_f$-containing polyurethanes and poly(meth)acrylates. Especially preferred are copolymers of fluorochemical (meth)acrylate monomers with a co-polymerizable monovinyl compound or a conjugated diene. The co-polymerizable monovinyl compounds include alkyl (meth)acrylates, vinyl esters of aliphatic acids, styrene and alkyl styrene, vinyl halides, vinylidene halides, alkyl esters, vinyl alkyl ketones, and acrylamides. The conjugated dienes are preferably 1,3-butadienes. Representative compounds within the preceding classes include the methyl, propyl, butyl, 2-hydroxypropyl, 2-hydroxyethyl, isoamyl, 2-ethylhexyl, octyl, decyl, lauryl, cetyl, and octadecyl acrylates and methacrylates; vinyl acetate, vinyl propionate, vinyl caprylate, vinyl laurate, vinyl stearate, styrene, alpha methyl styrene, p-methylstyene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, N-methylolacrylamide, N-methylolmethacrylamide, glycidyl acrylate, glycidyl methacrylate, amine-terminated (meth)acrylates, and polyoxy(meth)acrylates.

Hydrophobic non-fluorinated acrylic polymers include copolymers of monovinyl compounds, including alkyl (meth)acrylates, vinyl esters of aliphatic acids, styrene and alkyl styrene, vinyl halides, vinylidene halides, alkyl esters, vinyl alkyl ketones, and acrylamides. The conjugated dienes are preferably 1,3-butadienes. Representative compounds within the preceding classes include the methyl, propyl, butyl, 2-hydroxypropyl, 2-hydroxyethyl, isoamyl, 2-ethylhexyl, octyl, decyl, lauryl, cetyl, and octadecyl acrylates and methacrylates; vinyl acetate, vinyl propionate, vinyl caprylate, vinyl laurate, vinyl stearate, styrene, alpha methyl styrene, p-methylstyene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro -1,3-butadiene, 2,3-dichloro-1,3-butadiene, isoprene, N-methylolacrylamide, N-methylolmethacrylamide, glycidyl acrylate, glycidyl methacrylate, amine-terminated (meth)acrylates, and polyoxy(meth)acrylates.

Hydrophobic non-fluorinated urethanes include, for example, urethanes synthesized by reacting an isocyanate compound with the hydrophobic compounds described above as an alcohol reagent. These compounds are described in US2014/0295724 and US2016/0090508. Hydrophobic non-fluorinated nonionic acrylic polymers include, for example, polymers made by polymerizing or copolymerizing an acrylic ester of the hydrophobic compounds described above. Such compounds are described in US2016/0090686.

The non-fluorinated compounds and surface active agents are effectively introduced to the coating composition by thoroughly stirring it in at room or ambient temperature. More elaborate mixing can be employed such as using a mechanical shaker or providing heat or other methods.

The coating composition of the present invention optionally further comprises additional components such as additional treating agents or finishes to achieve additional surface effects, or additives commonly used with such agents or finishes. One or more such treating agents or finishes can be combined with the blended composition and applied to the article. Other additives commonly used with such treating agents or finishes may also be present such as surfactants, pH adjusters, cross linkers, wetting agents, and other additives known by those skilled in the art. Further, other extender compositions are optionally included to obtain a combination of benefits.

In one aspect, the invention relates to article comprising a substrate coated with a coating composition, where the coating composition comprises 10 to 100% by weight of a non-fluorinated compound mixture, based on the total solids weight of the coating, where the non-fluorinated compound mixture comprises at least one compound from b, and at least one compound from a, c, or d:

a) an alkali metal salt of poly(meth)acrylic acid, alkali metal salt of poly(meth)acrylic acid copolymer, ammonium compound salt of poly(meth)acrylic acid, amine salt of poly(meth)acrylic acid, ammonium compound salt of poly (meth)acrylic acid copolymer, amine salt of poly(meth) acrylic acid copolymer, or mixtures thereof;

b) silicone polyether, alkali metal salt of silicone polyether carboxylate, ammonium compound salt of silicone polyether carboxylate, amine salt of silicone polyether carboxylate, or mixtures thereof;

c) alkali metal salt of hydrolyzed α-olefin/maleic anhydride copolymer, ammonium compound salt of hydrolyzed α-olefin/maleic anhydride copolymer, amine salt of hydrolyzed α-olefin/maleic anhydride copolymer, alkali metal salt of esterified α-olefin/maleic anhydride copolymer, ammonium compound or amine salt of esterified α-olefin/maleic anhydride copolymer, α-olefin/maleic anhydride copolymer amic acid resin, salt of α-olefin/maleic anhydride copolymer amic acid resin, or mixtures thereof; or d) polycarboxylate calcium sequestrants or mixtures thereof; and where the at least one compound from b is from formula (I) or (II) wherein $R^1$, $R^2$, and $R^3$ are independently $C_1$-$C_8$ alkyl groups; X is a linear or branched $C_1$-$C_4$ alkylene group; $R^4$ is independently H or —C(O)—Y—C(O)O$^-$M$^+$; Y is a linear or branched, saturated or unsaturated $C_1$-$C_5$ alkylene group; M is independently H, alkali metal, $NH_4^+$, dialkyl ammonium cation, or amine cation; a and b are independently integers of 1 to 40 where a+b is an integer of at least 2; and c and d are independently integers of 0 to 20 where c+d is an integer of at least 1; $R^5$ is H, a $C_1$-$C_5$ alkyl group, or —C(O)—Y—C(O)O$^-$M$^+$; and e is an integer of 1 to 40. This embodiment may be combined with one or more of the previously described embodiments.

In another aspect, the invention relates to a method of providing a surface effect to a substrate, the method comprising contacting a substrate with a coating composition, where the coating composition comprises 10 to 100% by weight of a non-fluorinated compound mixture, based on the total solids weight of the coating, where the non-fluorinated compound mixture comprises at least one compound from b, and at least one compound from a, c, or d:

a) an alkali metal salt of poly(meth)acrylic acid, alkali metal salt of poly(meth)acrylic acid copolymer, ammonium compound salt of poly(meth)acrylic acid, amine salt of poly(meth)acrylic acid, ammonium compound salt of poly (meth)acrylic acid copolymer, amine salt of poly(meth) acrylic acid copolymer, or mixtures thereof;

b) silicone polyether, alkali metal salt of silicone polyether carboxylate, ammonium compound salt of silicone polyether carboxylate, amine salt of silicone polyether carboxylate, or mixtures thereof;

c) alkali metal salt of hydrolyzed α-olefin/maleic anhydride copolymer, ammonium compound salt of hydrolyzed α-olefin/maleic anhydride copolymer, amine salt of hydrolyzed α-olefin/maleic anhydride copolymer, alkali metal salt of esterified α-olefin/maleic anhydride copolymer, ammonium compound or amine salt of esterified α-olefin/maleic anhydride copolymer, α-olefin/maleic anhydride copolymer amic acid resin, salt of α-olefin/maleic anhydride copolymer amic acid resin, or mixtures thereof; or d) polycarboxylate calcium sequestrants or mixtures thereof; and where the at least one compound from b is from formula (I) or (II) wherein $R^1$, $R^2$, and $R^3$ are independently $C_1$-$C_8$ alkyl groups; X is a linear or branched $C_1$-$C_4$ alkylene group; $R^4$ is independently H or —C(O)—Y—C(O)O$^-$M$^+$; Y is a linear or branched, saturated or unsaturated $C_1$-$C_5$ alkylene group; M is independently H, alkali metal, $NH_4^+$, dialkyl ammonium cation, or amine cation; a and b are independently integers of 1 to 40 where a+b is an integer of at least 2; and c and d are independently integers of 0 to 20 where c+d is an integer of at least 1; $R^5$ is H, a $C_1$-$C_5$ alkyl group, or —C(O)—Y—C(O)O$^-$M$^+$; and e is an integer of 1 to 40. This embodiment may be combined with one or more of the previously described embodiments.

In one aspect, the substrate is a porous hard surface, such as unglazed concrete, grout, stone, granite, limestone, brick, tile, marble, grout, terrazzo, gypsum board, wall or ceiling panel, mortar, statuary, monument, wood, or composite material; a non-porous hard substrate such as glass, metal, or proppant particle; a fibrous substrate, such as fibers, yarns, fabrics, fabric blends, textiles, nonwovens, paper, leather, and carpets; or a combination thereof. The contacting step may occur by applying the non-fluorinated compound in the form of an aqueous solution, aqueous dispersion, organic solvent solution or dispersion, or cosolvent solution or dispersion. The contacting step may occur by any conventional method, including but not limited to exhaustion, foam, flex-nip, nip, pad, kiss-roll, beck, skein, winch, liquid injection, overflow flood, brush, spraying, rolling, dip-squeeze, painting, dripping, immersing, powder coating, tumbling, or screen printing.

In one embodiment, the articles are fibrous substrates, including fibers, textiles, paper, nonwovens, leather, fabrics, fabric blends or a combination thereof. By "fabrics" is meant natural or synthetic fabrics, or blends thereof, composed of fibers such as cotton, rayon, silk, wool, polyester, polypropylene, polyolefins, nylon, and aramids such as "NOMEX"

and "KEVLAR." By "fabric blends" is meant fabric made of two or more types of fibers. Typically these blends are a combination of at least one natural fiber and at least one synthetic fiber, but also can be a blend of two or more natural fibers or of two or more synthetic fibers.

The coatings of the present invention applied to fibrous substrates optionally further comprise a blocked isocyanate to promote durability, added after copolymerization (i.e., as a blended isocyanate). An example of a suitable blocked isocyanate is PHOBOL XAN available from Huntsman Corp, Salt Lake City, Utah. Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to fibers. When added as a blended isocyanate, amounts up to about 20% by weight are added. When synthetic fabrics are treated, a wetting agent can be used, such as ALKANOL 6112 available from E. I. du Pont de Nemours and Company, Wilmington, Del. As a further example, when cotton or cotton-blended fabrics are treated, a wrinkle-resistant resin can be used such as PERMA-FRESH EFC available from Emerald Carolina, LLC, Charlotte, N.C. As a further example, when nonwoven fabrics are treated, a wax extender can be employed such as FREEPEL 1225WR, available from Omnova Solutions Chester, S.C. An antistat such as ZELEC KC, available from Stepan, Northfield, Ill., or a wetting agent, such as hexanol, also are suitable. The dispersions are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features.

In one embodiment, the contacting step occurs inside a laundry machine. This step may be practiced by any suitable method. For example, water is used to help disperse the coating composition, such as by a wash cycle or rinse cycle of the laundry machine. The water temperature used in the wash cycle or rinse cycle may be any temperature including cold, room temperature, warm, or hot. Methods of contacting the additive with the substrate include, but are not limited to, introducing the coating composition by pouring into the basin of the laundry machine, pouring the coating composition into a detergent or treating agent reservoir of the laundry machine, adding a dissolvable pouch containing the coating composition, or adding a controlled-coating composition may be introduced into an aqueous liquor and contacted with a fibrous substrate into a tub, bucket or sink, such as when washing fabrics by hand. In one aspect, the coating composition is part of a detergent composition, and the non-fluorinated compound forms a finish coating on the finished dry fabric.

In one embodiment, the coating composition is poured into the wash basin, or into a detergent or treating agent reservoir, of the laundry machine and the machine is programmed to run a wash cycle or rinse cycle. In one embodiment, the wash basin is partially filled with water, the laundry treatment composition or laundry additive composition is poured into the water, and the water is allowed to fill the wash basin. Detergent is then optionally added, the fibrous substrate is added to the wash basin, and the laundry machine is allowed to run a full wash or rinse cycle.

In one aspect, the article is a solid proppant particle. The solid proppant may be coated by any suitable method known to one skilled in the art. The solid proppant is contacted with a liquid non-fluorinated compound dispersion and mixed by roll-mill for 5 minutes. The surface-treated proppant is then separated from the excess liquid and dried in an oven at 100° C. to provide a solid surface-treated proppant. Proppant materials to be surface-treated include but are not limited to sand, thermoplastic particles, alumina particles, glass bubble or glass bead particles, and clay particles. Preferably, the proppant material is sand. The surface-treated proppants of the present invention have a mesh size of at least 100 (up to and including 149 micrometers).

In one aspect, the method further comprises the step of heating the partially or completely coated article. For example, the non-fluorinated agent may be applied, and the treated article may be heated to melt, flow, dry, or otherwise fix the hydrophobic agent onto the article surface. In another aspect, the method further comprises the step of subjecting the coating composition to UV radiation. The final coating on the article surface will be a solidified, lasting, permanent coating. In another aspect, the method further comprises the step of solidifying the coating by drying, cooling, or allowing to cool. The liquid carrier may be dried by heating or air drying to allow for evaporation of the liquid carrier, thus leaving a permanent solid coating.

Test Methods and Materials

All solvents and reagents, unless otherwise indicated, were purchased from Sigma-Aldrich, St. Louis, Mo., and used directly as supplied. MPEG 750 is a poly(ethylene glycol) methyl ether 750 and is commercially available from Sigma-Aldrich, St. Louis, Mo.

DISSOLVINE GL-47-S is a tetrasodium salt of L-glutamic acid N,N-diactic acid, commercially available from Akzo-Nobel, Amsterdam, Netherlands.

SILUBE CS-1 is a PEG-8-dimethicone succinate, SILUBE CS D204 is a silicone alkyl polyether, and SIL-SURF D212-CG is a PEG-12 dimethicone, all commercially available from Siltech, Dacula, Ga.

SMA 1000 H solution is an aqueous ammonium salt of 1:1 styrene: maleic anhydride copolymer with a molecular weight $M_n$=2,000 Da and $M_w$=5,500 Da; SMA 1000 MA is a low molecular weight styrene maleic anhydride amic acid resin; SMA 1000 HK is an aqueous potassium salt of styrene maleic anhydride copolymer; SMA 1440 H is a hydrolyzed ammonium salt solution of styrene: maleic anhydride copolymer monoester with a molecular weight $M_n$=2,900 Da and $M_w$=7000 Da; SMA 1550 H is a hydrolyzed solution of styrene: maleic anhydride copolymer monoester; SMA 2000 H is an aqueous ammonium salt of 2:1 styrene: maleic anhydride copolymer with a molecular weight $M_n$=2,700 Da and $M_w$=7,500 Da; SMA 3000 H is an aqueous ammonium salt of 3:1 styrene: maleic anhydride copolymer with a molecular weight $M_n$=2,700 Da and $M_w$=7,500 Da; SMA 2625 H is a hydrolyzed ammonium salt solution of styrene: maleic anhydride copolymer monoester with a molecular weight $M_n$=3,100 Da and $M_w$=9000 Da; SMA 17352 H is a hydrolyzed ammonium salt solution of styrene: maleic anhydride copolymer monoester with a molecular weight $M_n$=2,900 Da and $M_w$=7,000 Da; and SMA 1000 HNa is an aqueous sodium salt of styrene maleic anhydride copolymer with a molecular weight $M_n$=2,000 Da and $M_w$=5,500 Da, all available from TOTAL Cray Valley, Exton, Pa.

AQUATREAT AR6 is a poly(acrylic acid) polymer of molecular weight $M_w$ 500,000 Da, available from Akzo-Nobel, Amsterdam, Netherlands.

ZELAN 8719 is available from The Chemours Company, Wilmington, Del.

DESMODUR N100 is an isocyanate compound available from Bayer Corporation, Pittsburgh, Pa.

The following test methods and materials were used in the examples herein.

Test Methods

Test Method 1—Fabric Treatment

The fabrics treated in this study were 100% by weight khaki cotton twill available from Mount Vernon, Trion, Ga. The fabric was treated with the aqueous dispersions of various emulsion polymers using a conventional pad bath (dipping) process. The prepared concentrated dispersions were diluted with deionized water to achieve a pad bath having 60 g/L of the product in the bath. The fabric was padded in the bath, and the excess liquid was removed by squeeze rollers. The wet pickup was around 70% on the cotton substrate. The "wet pick up" is the weight of the bath solution of the emulsion polymer applied to the fabric, based on the dry weight of the fabric. The fabric was cured at approximately 165° C. for 3 minutes and allowed to "rest" after treatment and cure for at least 15 hours.

Test Method 2—Water Drop

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances. The composition of standard test liquids is shown in the following Table 1. Ratings of 0.5 increments are determined by subtracting one half from the numbers in Table 1 for borderline passing of the test liquid.

TABLE 1

Standard Test Liquids

| Water Repellency Rating Number | Composition Vol. %, Isopropyl Alcohol | Composition, Vol. % Distilled Water |
|---|---|---|
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Test Method 3—Oil Repellency

The treated fabric samples were tested for oil repellency by a modification of AATCC standard Test Method No. 118, conducted as follows: A fabric sample, treated with an aqueous dispersion of polymer, was conditioned for a minimum of 15 hours at 23° C.+65% relative humidity prior to testing. A series of organic liquids, identified below in Table 2, were then applied drop wise to the fabric samples. Beginning with the lowest numbered test liquid (Repellency Rating No. 1), one drop (approximately 5 mm in diameter or 0.05 mL volume) was placed on each of three locations at least 5 mm apart. The drops were observed for 30 seconds. If, at the end of this period, two of the three drops were still spherical in shape with no wicking around the drops, three drops of the next highest numbered liquid were placed on adjacent sites and similarly observed for 30 seconds. The procedure was continued until one of the test liquids resulted in two of the three drops failing to remain spherical to hemispherical, or wetting or wicking occurred.

The oil repellency rating of the fabric was the highest numbered test liquid for which two of the three drops remained spherical to hemispherical, with no wicking for 30 seconds. Ratings of 0.5 increments were determined by subtracting one-half from the number in Table 2 for borderline passing of the next liquid. Higher ratings indicate greater repellency. The composition of oil repellency test liquids is shown in the Table 2.

TABLE 2

Oil Repellency Test Liquids

| Oil Repellency Rating | Test Solution |
|---|---|
| 1 | NUJOL Purified Mineral Oil |
| 2 | 65/35 NUJOL/n-hexadecane by volume at 21° C. |
| 3 | n-hexadecane |
| 4 | n-tetradecane |
| 5 | n-dodecane |
| 6 | n-decane |

Test Method 4—Spray Test

The dynamic water repellency of treated substrates was measured according to the American Association of Textile Chemists and Colorists (AATCC) TM-22. Samples are visually scored by reference to published standards, with a rating of 100 denoting no water penetration or surface adhesion. A rating of 90 denotes slight random sticking or wetting without penetration; lower values indicate progressively greater wetting and penetration. Test Method 2, the dynamic water repellency test, is a demanding and realistic test of water repellency.

Test Method 5—Stain Release

This test measures the ability of a fabric to release oily stains during home laundering.

Treated textiles are placed on a flat surface. Using an eyedropper, 5 drops of MAZOLA Corn Oil or mineral oil (0.2 mL) were placed onto the fabric to form 1 drop of oil. A weight (5 lb, 2.27 kg) is placed on top of the oil drop with a piece of glassine paper separating the oil drop. The weight was left in place for 60 seconds. After 60 seconds, the weight and glassine paper are removed. The textiles samples were then washed using a automatic washer high for 12 minutes with AATCC 1993 Standard Reference Detergent WOB12 or granular detergent (100 g). The textiles were then dried on high for 45-50 minutes. The textiles were then evaluated for residual stain of 1 to 5, 1 having the largest residual stain remaining and 5 being no stain residual was visible. A plus "+" sign was used to indicate the stain release was slightly better than the rating level, and a minus sign "−" was used to indicate the stain release was slightly worse than the rating level. In the examples below, stain release ratings of corn oil are designated by the term "Corn Oil", and stain release ratings of mineral oil are designated by the term "Mineral Oil".

Test Method 6—Wash Durability

The fabric samples were laundered according to International Standard specified domestic washing procedure for textile testing. Fabric samples were loaded into a horizontal drum, front-loading type (Type A, WASCATOR FOM 71MP-Lab) of automatic washing machine with a ballast load to give a total dry load of 4 lb. A commercial detergent was added (AATCC 1993 standard Reference Detergent WOB) and the washer program ISO 6330:2001-4M was used. After washing was complete, the entire load was placed into a KENMORE automatic dryer and dried on high for 45-50 min. The term "10 HW" indicates that the fabric was washed 10 times in an automatic washing machine.

The present invention is not to be limited by the examples below.

EXAMPLES

Comparative Example A

Cotton fabric was tested without any non-fluorianted compound treatment, according to the test methods above.

Examples 1-2

SILSURF D212 CG, SILUBE CS-1, and DISSOLVINE GL-47-S were mixed in a vessel according to Table 3. Glacial acetic acid (60%) was added to lower the pH to 8.5-9.5, and water was added to adjust the solids to 19% by weight. A 200-g pad bath was formed with 1.8% by weight of the non-fluorinated compound solids and tested according to the test methods above.

TABLE 3

Composition (solids % by weight) of Examples 1-2

| Ex | SILSURF D212 CG | SILUBE CS-1 | DISSOLVINE GL-47-S |
|---|---|---|---|
| 1 | 51 | 0 | 49 |
| 2 | 0 | 51 | 49 |

TABLE 4

Performance of Examples 1-2 on Cotton

| | | Example | | |
|---|---|---|---|---|
| | | A | 1 | 2 |
| Water Drop | Initial | 0 | 0 | 0 |
| | After 10 HW | 0 | 0 | 0 |
| Spray Rating | Initial | 25 | 25+ | 25+ |
| | After 10 HW | 0 | 0 | 0 |
| Stain Release Corn Oil | Initial | 3.5+ | 3.5 | 3.5 |
| | After 10 HW | 3.5− | 3 | 3.5 |
| Stain Release Mineral Oil | Initial | 3 | 3 | 3 |
| | After 10 HW | 3 | 3 | 3.5 |

Examples 3-6

SILSURF D212 CG, SILUBE CS-1, DISSOLVINE GL-47-S, SMA 1000 H, and SMA 1000 HNa were mixed in a vessel according to Table 5. The pH was tested at 8.5-9.5, and water was added to adjust the solids to 25% by weight. A 200-g pad bath was formed with 1.8% by weight of the non-fluorinated compound solids and tested according to the test methods above.

TABLE 5

Composition (solids % by weight) of Examples 3-6

| Ex | SILSURF D212 CG | SILUBE CS-1 | DISSOLVINE GL-47-S | SMA 1000 H | SMA 1000 HNa |
|---|---|---|---|---|---|
| 3 | 32.75 | 0 | 30.57 | 36.68 | 0 |
| 4 | 0 | 32.75 | 30.57 | 36.68 | 0 |
| 5 | 32.75 | 0 | 30.57 | 0 | 36.68 |
| 6 | 0 | 32.75 | 30.57 | 0 | 36.68 |

TABLE 6

Performance of Examples 3-6 on Cotton

| | | Example | | | |
|---|---|---|---|---|---|
| | | 3 | 4 | 5 | 6 |
| Water Drop | Initial | 0 | 0 | 0 | 0 |
| | After 10 HW | 0 | 0 | 0 | 0 |
| Spray Rating | Initial | 25 | 25 | 25 | 25 |
| | After 10 HW | 0 | 0 | 0 | 0 |
| Stain Release Corn Oil | Initial | 3.5+ | 3.5+ | 3 | 3.5 |
| | After 10 HW | 4 | 4 | 3 | 3.5 |
| Stain Release Mineral Oil | Initial | 3 | 3.5 | 3 | 3 |
| | After 10 HW | 3.5 | 3.5 | 3 | 3.5 |

Examples 7-10

SILSURF D212 CG, SILUBE CS-1, SMA 1000 H, and SMA 1000 HNa were mixed in a vessel according to Table 7. The pH was tested at 8.5-9.5, and water was added to adjust the solids to 25% by weight. A 200-g pad bath was formed with 1.8% by weight of the non-fluorinated compound solids and tested according to the test methods above.

TABLE 7

Composition (solids % by weight) of Examples 7-10

| Ex | SILSURF D212 CG | SILUBE CS-1 | SMA 1000 H | SMA 1000 HNa |
|---|---|---|---|---|
| 7 | 32.71 | 0 | 67.29 | 0 |
| 8 | 0 | 32.71 | 67.29 | 0 |
| 9 | 32.71 | 0 | 0 | 67.29 |
| 10 | 0 | 32.71 | 0 | 67.29 |

TABLE 8

Performance of Examples 7-10 on Cotton

| | | Example | | | |
|---|---|---|---|---|---|
| | | 7 | 8 | 9 | 10 |
| Water Drop | Initial | 0 | 0 | 0 | 0 |
| | After 10 HW | 0 | 0 | 0 | 0 |
| Spray Rating | Initial | 25 | 25+ | 25 | 25 |
| | After 10 HW | 0 | 0 | 0 | 0 |
| Stain Release Corn Oil | Initial | 4 | 4 | 3 | 3 |
| | After 10 HW | 3.5 | 4.5 | 4 | 4 |
| Stain Release Mineral Oil | Initial | 3.5 | 3 | 3 | 3 |
| | After 10 HW | 3.5 | 3 | 3 | 3 |

Examples 11-15

SILSURF D212 CG, SILUBE CS-1, AQUATREAT AR6, SMA 1000 H, and SMA 1000 HNa were mixed in a vessel according to Table 9. The pH was tested at 8.5-9.5, and water was added to adjust the solids to 15% by weight (Examples 11-12), 11.1% by weight (Example 13), 12.2% by weight (Example 14), or 11.8% by weight (Example 15). A 200-g pad bath was formed with 1.8% by weight of the non-fluorinated compound solids and tested according to the test methods above.

TABLE 9

Composition (solids % by weight) of Examples 11-15

| Ex | SILSURF D212 CG | SILUBE CS-1 | AQUATREAT AR6 | SMA 1000 HNa |
|---|---|---|---|---|
| 11 | 0 | 0 | 45.99 | 54.01 |
| 12 | 23.53 | 0 | 22.35 | 54.12 |
| 13 | 0 | 23.53 | 22.35 | 54.12 |
| 14 | 17.73 | 0 | 45.39 | 36.88 |
| 15 | 0 | 17.73 | 45.39 | 36.88 |

TABLE 10

Performance of Examples 11-15 on Cotton

| | | Example | | | | |
|---|---|---|---|---|---|---|
| | | 11 | 12 | 13 | 14 | 15 |
| Water Drop | Initial | 0 | 0 | 0 | 0 | 0 |
| | After 10 HW | 0 | 0 | 0 | 0 | 0 |
| Spray Rating | Initial | 25+ | 25+ | 25+ | 25+ | 25+ |
| | After 10 HW | 0 | 0 | 0 | 0 | 0 |
| Stain Release Corn Oil | Initial | 3 | 3.5 | 3 | 3 | 3 |
| | After 10 HW | 3 | 3.5 | 4 | 4.5 | 4 |
| Stain Release Mineral Oil | Initial | 3− | 3 | 3 | 3 | 3 |
| | After 10 HW | 3− | 3 | 3.5 | 3 | 3 |

Comparative Example B

A 200-g pad bath was formed at 60 g/L at 30% solids of SILUBE CS-1 and tested according to the test methods above.

Comparative Example C

Comparative Example B was repeated, using SILSURF D212-CG instead of SILUBE CS-1.

TABLE 11

Performance of Comparative Examples B and C on Cotton

| | | Example | |
|---|---|---|---|
| | | B | C |
| Water Drop | Initial | 25 | −25 |
| | After 10 HW | 25 | 0 |
| Spray Rating | Initial | 0 | 0 |
| | After 10 HW | 0 | 0 |
| Stain Release Corn Oil | Initial | 2.5 | 3 |
| | After 10 HW | 3.5 | 3 |
| Stain Release Mineral Oil | Initial | 3 | 3 |
| | After 10 HW | 3.5 | 3 |

Preparation 1

A stain release composition was synthesized. Into a 4-neck round bottom flask equipped with an overhead stirrer, thermocouple and condenser was added DESMODUR N100 (135 g), MPEG 750 (378 g), sodium carbonate (3.1 g) and catalyst. The mixture was heated to 80° C. After 1 hour, sorbitan tristearate (161 g) was added and heated to 95° C. until no active isocyanates were present. Water (2357 g) and acetic acid (4.4 g) were added to a beaker and stirred to form a solution. The solution was heated to 65° C. The mixture was immersion blended and homogenized at 6000 psi. The resulting urethane dispersion was at 20.54% solids after cooling and filtering.

Examples 16-29 and Comparative Examples D-J

SILUBE CS-1 and an SMA compound were mixed in a solids weight ratio of 30:70 according to Table 12. The pH was adjusted to 8-9 with ammonium hydroxide. Some mixtures were blended in a solids weight ratio of 50:50 with a stain release compound from Preparation 1. A 200-g pad bath was formed with 60 g/L at 20% solids of the mixtures and tested according to the test methods above.

TABLE 12

Composition (solids % by weight) of Examples 16-29 and Comparative Examples D-J

| Ex | SMA Compound | Stain Release Added |
|---|---|---|
| D | SMA 1000 MA without SILUBE CS-1 | No |
| 16 | SMA 1000 MA | No |
| 17 | SMA 1000 MA | Yes |
| E | SMA 1440 H without SILUBE CS-1 | No |
| 18 | SMA 1440 H | No |
| 19 | SMA 1440 H | Yes |
| F | SMA 1550 H without SILUBE CS-1 | No |
| 20 | SMA 1550 H | No |
| 21 | SMA 1550 H | Yes |
| G | SMA 2000 H without SILUBE CS-1 | No |
| 22 | SMA 2000 H | No |
| 23 | SMA 2000 H | Yes |
| H | SMA 2625 H without SILUBE CS-1 | No |
| 24 | SMA 2625 H | No |
| 25 | SMA 2625 H | Yes |
| I | SMA 3000 H without SILUBE CS-1 | No |
| 26 | SMA 3000 H | No |
| 27 | SMA 3000 H | Yes |
| J | SMA 17352 H without SILUBE CS-1 | No |
| 28 | SMA 17352 H | No |
| 29 | SMA 17352 H | Yes |

TABLE 13

Performance of Examples 16-29 and Comparative Examples D-J on Cotton

| Example | Initial Spray Rating | Initial Stain Release Corn Oil | Initial Stain Release Mineral Oil |
|---|---|---|---|
| D | 0 | 3.5 | 3 |
| 16 | 0 | 3.5 | 3 |
| 17 | 0 | 3.5 | 2.5 |
| E | 70 | 2.5 | 2 |
| 18 | 0 | 3.5 | 3 |
| 19 | 0 | 3.5 | 3 |
| F | 50 | 3 | 2.5 |
| 20 | 0 | 3.5 | 3 |
| 21 | 0 | 4 | 3.5 |
| G | 70 | 1.5 | 1 |
| 22 | 0 | 3 | 3 |
| 23 | 0 | 3.5 | 3 |
| H | 80 | 2 | 1.5 |
| 24 | 0 | 3 | 2.5 |
| 25 | 0 | 3 | 3 |
| I | 80 | 2 | 1.5 |

TABLE 13-continued

Performance of Examples 16-29 and Comparative Examples D-J on Cotton

| Example | Initial Spray Rating | Initial Stain Release Corn Oil | Initial Stain Release Mineral Oil |
|---|---|---|---|
| 26 | 0 | 3 | 2.5 |
| 27 | 0 | 3 | 3 |
| J | 80 | 2 | 1.5 |
| 28 | 0 | 3 | 2.5 |
| 29 | 0 | 3.5 | 3 |

Examples 30-43 and Comparative Example K

SMA 1000 H and a silicone compound were mixed in a solids weight ratio according to Table 14. The pH was adjusted to 8-9 with ammonium hydroxide. Some mixtures were blended with a stain release compound from Preparation 1 in a solids weight ratio according to Table 14. A 200-g pad bath was formed with 60 g/L at 30% solids of the mixtures and tested according to the test methods above.

TABLE 14

Composition (solids % by weight) of Examples 30-43 and Comparative Example K

| Ex. | Silicone Compound | Ratio of SMA to Silicone Compound | Stain Release Added | Ratio of Mixture to Stain Release Compound |
|---|---|---|---|---|
| 30 | SILUBE CS-1 | 50:50 | No | N/A |
| 31 | SILUBE CS-1 | 50:50 | Yes | 50:50 |
| 32 | SILUBE CS-1 | 50:50 | Yes | 25:75 |
| 33 | SILUBE CS-1 | 67:33 | No | N/A |
| 34 | SILUBE CS-1 | 67:33 | Yes | 50:50 |
| 35 | SILUBE CS-1 | 67:33 | Yes | 25:75 |
| 36 | SILUBE CS D204 | 50:50 | No | N/A |
| 37 | SILUBE CS D204 | 50:50 | Yes | 50:50 |
| 38 | SILUBE CS D204 | 50:50 | Yes | 25:75 |
| 39 | SILUBE CS D204 | 67:33 | No | N/A |
| 40 | SILUBE CS D204 | 67:33 | Yes | 50:50 |
| 41 | SILUBE CS D204 | 67:33 | Yes | 25:75 |
| 42 | SILUBE CS-1 | 75:25 | No | N/A |
| 43 | SILUBE CS-1 | 85:15 | No | N/A |
| K | None | 100:0 | No | N/A |

TABLE 15

Performance of Examples 30-43 and Comparative Example K

| | Spray Rating | | Water Drop | | Stain Release Corn Oil | | Stain Release Mineral Oil | |
|---|---|---|---|---|---|---|---|---|
| Ex. | Initial | After 10 HW | Initial | After 10 HW | Initial | After 10 HW | Initial | After 10 HW |
| 30 | 0 | 0 | 25 | 25 | 4 | 4 | 4 | 3.5+ |
| 31 | 0 | 0 | −25 | −25 | 4 | 4 | 3.5 | 3.5 |
| 32 | 0 | 0 | 25 | −50 | 4 | 4 | 3.5 | 3.5 |
| 33 | 0 | 0 | 25+ | 25 | 4 | 3.5 | 3.5 | 3.5 |
| 34 | 0 | 0 | 25+ | 25 | 4 | 5 | 3 | 3 |
| 35 | 0 | 0 | 25+ | −50 | 4 | 3.5 | 3 | 3 |
| 36 | 0 | 0 | 25+ | −25 | 4 | 4 | 3.5 | 3.5 |
| 37 | 0 | 0 | 25 | 25 | 3.5 | 4 | 3.5 | 3.5 |
| 38 | 0 | 0 | 25 | 25 | 4.5 | 5 | 3 | 4 |
| 39 | 0 | 0 | 25 | 25 | 4 | 3.5 | 4 | 3 |
| 40 | 0 | 0 | 25+ | 25 | 4.5 | 4.5 | 3.5 | 4 |
| 41 | 0 | 0 | 50 | 50 | 4 | 4 | 3 | 3 |
| 42 | 0 | 0 | 25 | −25 | 4 | 4 | 3.5 | 3 |
| 43 | 0 | 0 | 25 | 25 | 2.5 | 3.5 | 2.5 | 3.5 |
| K | 0 | 0 | 25+ | 0 | 1.5 | 3 | 1.5 | 2 |

Example 44

SILSURF D212 (159.3 g), water (38 g), and SMA 1000H (802.7 g) were stirred at room temperature for 1 hour. The SILSURF D212/SMA 1000 H mixture was combined with STRODEX PK-OVOC and mixed together in a solids weight ratio of 66:33. A 200-g pad bath was formed with 60 g/L at 30% solids of the mixtures and tested according to the test methods above.

Example 45

ZELAN 8719, SILSURF D212-CG, and SMA 1000 H were mixed together in a solids weight ratio of 33:33:33. A 200-g pad bath was formed with 60 g/L at 30% solids of the mixtures and tested according to the test methods above.

Comparative Example L

Example 45 was repeated, using 100% ZELAN 8719.

Example 46

SILSURF D212-CG and SMA 1000 HK were mixed together in a solids weight ratio of 35:65. A 200-g pad bath was formed with 60 g/L at 30% solids of the mixtures and tested according to the test methods above.

Comparative Example M

Example 46 was repeated, using 100% SMA 1000 HK.

TABLE 16

Performance of Examples 44-46 and Comparative Examples L-M

| | Spray Rating | | Water Drop | | Stain Release Corn Oil | | Stain Release Mineral Oil | |
|---|---|---|---|---|---|---|---|---|
| Ex. | Initial | After 10 HW | Initial | After 10 HW | Initial | After 10 HW | Initial | After 10 HW |
| 44 | 0 | 0 | 25 | 0 | 4 | 4 | 3 | 2.5 |
| 45 | 0 | 0 | 25 | 25 | 3.5 | 4 | 3 | 3 |
| L | 0 | 0 | 50 | 55 | 3 | 2 | 2.5 | 2 |
| 46 | 0 | 0 | 0 | 0 | 3 | 3 | 2.5 | 2.5 |
| M | 0 | 0 | 0 | 0 | 2.5 | 3.5 | 2 | 3 |

What is claimed is:

1. A coating composition comprising 10 to 100% by weight of a non-fluorinated compound mixture, based on the total solids weight of the coating,
where the non-fluorinated compound mixture comprises at least one compound from b, and at least one compound from a or c:

a) an alkali metal salt of poly(meth)acrylic acid, ammonium compound salt of poly(meth)acrylic acid, amine salt of poly(meth)acrylic acid, or mixtures thereof;
b) silicone polyether, alkali metal salt of silicone polyether carboxylate, ammonium compound salt of silicone polyether carboxylate, amine salt of silicone polyether carboxylate, or mixtures thereof; or
c) alkali metal salt of hydrolyzed α-olefin/maleic anhydride copolymer, ammonium compound salt of hydrolyzed α-olefin/maleic anhydride copolymer, amine salt of hydrolyzed α-olefin/maleic anhydride copolymer, alkali metal salt of esterified α-olefin/maleic anhydride copolymer, ammonium compound or amine salt of esterified α-olefin/maleic anhydride copolymer, α-olefin/maleic anhydride copolymer amic acid resin, salt of α-olefin/maleic anhydride copolymer amic acid resin, or mixtures thereof;

where the non-fluorinated compound mixture has a pH of about 7 to about 10.5; and
where the at least one compound from b is from formula (I) or (II):

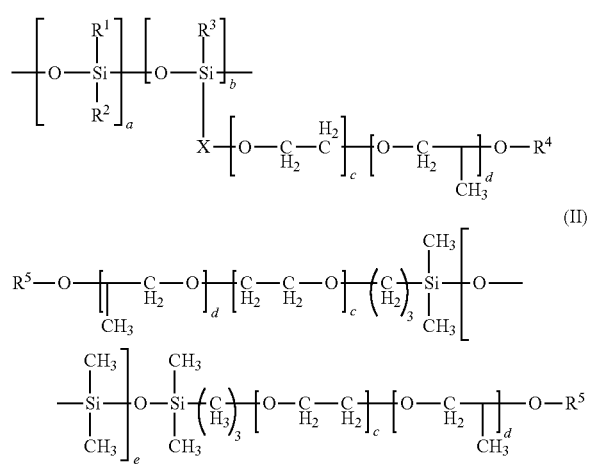

wherein
$R^1$, $R^2$, and $R^3$ are independently $C_1$-$C_8$ alkyl groups;
X is a linear or branched $C_1$-$C_4$ alkylene group;
$R^4$ is independently H or —C(O)—Y—C(O)O$^-$M$^{+;}$
Y is a linear or branched, saturated or unsaturated $C_1$-$C_5$ alkylene group;
M is independently H, alkali metal, $NH_4^+$, dialkyl ammonium cation, or amine cation;
a and b are independently integers of 1 to 40 where a+b is an integer of at least 2; and
c and d are independently integers of 0 to 20 where c+d is an integer of at least 1;
$R^5$ is H, a $C_1$-$C_5$ alkyl group, or —C(O)—Y—C(O)O$^-$M$^+$; and
e is an integer of 1 to 40.

2. The coating composition of claim 1, where the non-fluorinated compound mixture comprises at least one compound selected from an alkali metal salt of poly(meth)acrylic acid, ammonium compound salt of poly(meth)acrylic acid, amine salt of poly(meth)acrylic acid, or mixtures thereof.

3. The coating composition of claim 1, where the non-fluorinated compound mixture comprises at least one compound selected from an alkali metal salt of hydrolyzed α-olefin/maleic anhydride copolymer, ammonium compound salt of hydrolyzed α-olefin/maleic anhydride copolymer, amine salt of hydrolyzed α-olefin/maleic anhydride copolymer, alkali metal salt of esterified α-olefin/maleic anhydride copolymer, ammonium compound or amine salt of esterified α-olefin/maleic anhydride copolymer, α-olefin/maleic anhydride copolymer amic acid resin, salt of α-olefin/maleic anhydride copolymer amic acid resin, or mixtures thereof.

4. The coating composition of claim 1, where the non-fluorinated compound mixture further comprises at least one compound selected from a polycarboxylic acid calcium sequestrant or mixture of polycarboxylic acid calcium sequestrants.

5. The coating composition of claim 1, where the non-fluorinated compound mixture comprises at least one compound from a and at least one compound from c.

6. The coating composition of claim 1, further comprising a hydrophobic surface effect agent.

7. The coating composition of claim 6 wherein the hydrophobic surface effect agent is selected from the group consisting of hydrophobic non-fluorinated cationic acrylic polymers, hydrophobic non-fluorinated anionic acrylic polymers, hydrophobic non-fluorinated nonionic acrylic polymers, partially fluorinated urethanes, hydrophobic non-fluorinated urethanes, cationic partially fluorinated acrylic polymers or copolymers, nonionic partially fluorinated acrylic polymers or copolymers, partially fluorinated acrylamide polymers or copolymers, fluorinated phosphates, fluorinated ethoxylates, fluorinated or non-fluorinated organosilanes, silicones, waxes, and mixtures thereof.

8. The coating composition of claim 6, comprising 10 to 90% by weight of the non-fluorinated compound mixture and 10 to 90% by weight of the surface effect agent, based on the total solids weight of the coating composition.

9. The coating composition of claim 8, comprising 30 to 90% by weight of the non-fluorinated compound mixture and 10 to 70% by weight of the surface effect agent, based on the total solids weight of the coating composition.

10. The coating composition of claim 1, comprising 30 to 100% by weight of the non-fluorinated compound mixture, based on the total solids weight of the coating composition.

11. An article comprising a substrate coated with a coating composition, where the coating composition comprises 10 to 100% by weight of a non-fluorinated compound mixture, based on the total solids weight of the coating,
where the non-fluorinated compound mixture comprises at least one compound from b, and at least one compound from a or c:
a) an alkali metal salt of poly(meth)acrylic acid, ammonium compound salt of poly(meth)acrylic acid, amine salt of poly(meth)acrylic acid, or mixtures thereof;
b) silicone polyether, alkali metal salt of silicone polyether carboxylate, ammonium compound salt of silicone polyether carboxylate, amine salt of silicone polyether carboxylate, or mixtures thereof;
c) alkali metal salt of hydrolyzed α-olefin/maleic anhydride copolymer, ammonium compound salt of hydrolyzed α-olefin/maleic anhydride copolymer, amine salt of hydrolyzed α-olefin/maleic anhydride copolymer, alkali metal salt of esterified α-olefin/maleic anhydride copolymer, ammonium compound or amine salt of esterified α-olefin/maleic anhydride copolymer, α-olefin/maleic anhydride copolymer amic acid resin, salt of α-olefin/maleic anhydride copolymer amic acid resin, or mixtures thereof;
where the non-fluorinated compound mixture has a pH of about 7 to about 10.5; and
where the at least one compound from b is from formula (I) or (II):

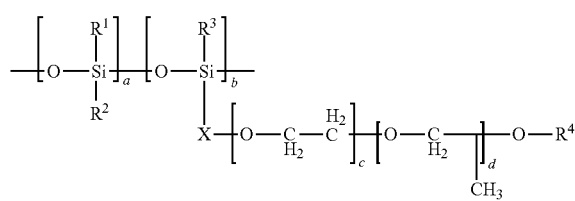

(I)

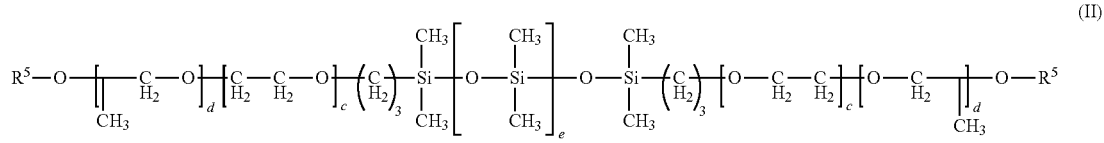

(II)

wherein
  $R^1$, $R^2$, and $R^3$ are independently $C_1$-$C_8$ alkyl groups;
  X is a linear or branched $C_1$-$C_4$ alkylene group;
  $R^4$ is independently H or —C(O)—Y—C(O)O$^-$M$^+$,
  Y is a linear or branched, saturated or unsaturated $C_1$-$C_5$ alkylene group;
  M is independently H, alkali metal, NH$_4^+$, dialkyl ammonium cation, or amine cation;
  a and b are independently integers of 1 to 40 where a+b is an integer of at least 2; and
  c and d are independently integers of 0 to 20 where c+d is an integer of at least 1;
  $R^5$ is H, a $C_1$-$C_5$ alkyl group, or —C(O)—Y—C(O)O$^-$M$^+$, and
  e is an integer of 1 to 40.

12. The article of claim 11, where the substrate is a textile, carpet, unglazed concrete, brick, tile, granite, limestone, marble, grout, mortar, statuary, monument, wood, composite material, terrazzo, gypsum board, wall or ceiling panel, metal, glass, proppant particle, or a combination thereof.

13. The article of claim 11, where the non-fluorinated compound mixture comprises at least one compound from a and at least one compound from c.

14. The article of claim 11, further comprising a hydrophobic surface effect agent selected from the group consisting of a fatty acid ester of cyclic or acyclic polyols, fatty esters of polycarboxylic acids, hydrophobic non-fluorinated cationic acrylic polymers, hydrophobic non-fluorinated anionic acrylic polymers, hydrophobic non-fluorinated nonionic acrylic polymers, partially fluorinated urethanes, hydrophobic non-fluorinated urethanes, cationic partially fluorinated acrylic polymers or copolymers, nonionic partially fluorinated acrylic polymers or copolymers, partially fluorinated acrylamide polymers or copolymers, fluorinated or non-fluorinated phosphates, fluorinated ethoxylates, fluorinated or non-fluorinated organosilanes, silicones, waxes, and mixtures thereof.

15. The article of claim 14, comprising 10 to 90% by weight of the non-fluorinated compound mixture and 10 to 90% by weight of the surface effect agent, based on the total solids weight of the coating composition.

16. The article of claim 11, comprising 30 to 100% by weight of the non-fluorinated compound mixture, based on the total solids weight of the coating composition.

17. A method of providing a surface effect to a substrate, the method comprising contacting a substrate with a coating composition, where the coating composition comprises 10 to 100% by weight of a non-fluorinated compound mixture, based on the total solids weight of the coating,
  where the non-fluorinated compound mixture comprises at least one compound from b, and at least one compound from a or c:
  a) an alkali metal salt of poly(meth)acrylic acid, ammonium compound salt of poly(meth)acrylic acid, amine salt of poly(meth)acrylic acid, or mixtures thereof;
  b) silicone polyether, alkali metal salt of silicone polyether carboxylate, ammonium compound salt of silicone polyether carboxylate, amine salt of silicone polyether carboxylate, or mixtures thereof;
  c) alkali metal salt of hydrolyzed α-olefin/maleic anhydride copolymer, ammonium compound salt of hydrolyzed α-olefin/maleic anhydride copolymer, amine salt of hydrolyzed α-olefin/maleic anhydride copolymer, alkali metal salt of esterified α-olefin/maleic anhydride copolymer, ammonium compound or amine salt of esterified α-olefin/maleic anhydride copolymer, α-olefin/maleic anhydride copolymer amic acid resin, salt of α-olefin/maleic anhydride copolymer amic acid resin, or mixtures thereof;
  where the non-fluorinated compound mixture has a pH of about 7 to about 10.5; and
  where the at least one compound from b is from formula (I) or (II):

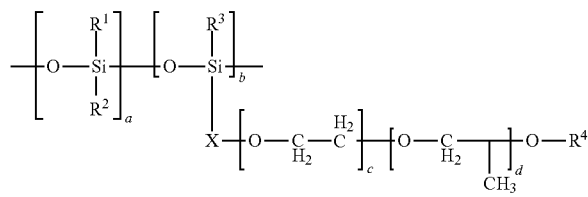

(I)

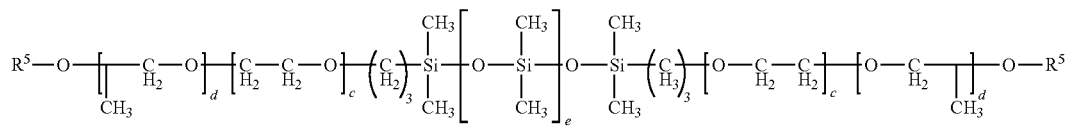

wherein
- $R^1$, $R^2$, and $R^3$ are independently $C_1$-$C_8$ alkyl groups;
- X is a linear or branched $C_1$-$C_4$ alkylene group;
- $R^4$ is independently H or —C(O)—Y—C(O)O$^-$M$^+$,
- Y is a linear or branched, saturated or unsaturated $C_1$-$C_5$ alkylene group;
- M is independently H, alkali metal, NH$_4^+$, dialkyl ammonium cation, or amine cation;
- a and b are independently integers of 1 to 40 where a+b is an integer of at least 2; and
- c and d are independently integers of 0 to 20 where c+d is an integer of at least 1;
- $R^5$ is H, a $C_1$-$C_5$ alkyl group, or —C(O)—Y—C(O)O$^-$M$^+$, and
- e is an integer of 1 to 40.

18. The method of claim 17, where the contacting step occurs by exhaustion, foam, flex-nip, nip, pad, kiss-roll, beck, skein, winch, liquid injection, overflow flood, roll, brush, roller, spray, dipping or immersion.

19. The method of claim 18, where the contacting step occurs inside a laundry machine.

20. The method of claim 17, where the surface effect is no iron, easy to iron, shrinkage control, wrinkle free, permanent press, moisture control, softness, strength, anti-slip, anti-static, anti-snag, anti-pill, stain release, soil repellency, soil release, water repellency, odor control, antimicrobial, sun protection, or cleanability.

* * * * *